Figure 1:
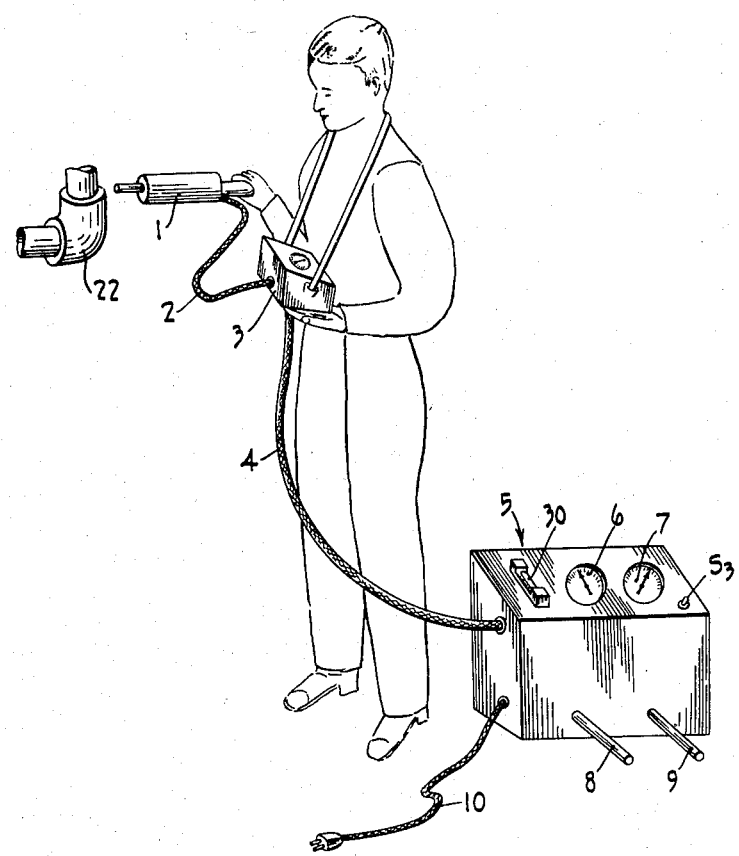

Aug. 2, 1960

J. F. PALMER ET AL 2,947,166

VAPOUR LEAK DETECTOR

Filed Nov. 5, 1956

4 Sheets-Sheet 2

Inventors
James F. Palmer
Russell B. Turner
By Ralph B. Stewart
attorney

United States Patent Office 2,947,166
Patented Aug. 2, 1960

2,947,166
VAPOUR LEAK DETECTOR

James F. Palmer and Russell B. Turner, Deep River, Ontario, Canada, assignors to Atomic Energy of Canada Limited, Ottawa, Ontario, Canada Filed Nov. 5, 1956, Ser. No. 620,404

12 Claims. (Cl. 73—407)

This invention relates to apparatus for detecting and measuring the rate of vapour leaks in pipes and vessels containing liquid.

All high pressure, high temperature fluid containing systems will inevitably contain a few leaks at some time. Many leaks which occur at relatively small, well defined areas are easily located, but when the size of the leak falls below a certain level the point of leakage becomes difficult to locate. As a matter of economy it is highly desirable to locate even the smallest leaks, especially in systems such as those used with atomic reactors where expensive heavy water may be used at high pressures and temperatures. In such systems it is also desirable to be able to measure the rate of leakage from the system while it is in service.

In order for an instrument to detect a very small leak while a system is being checked, it is necessary that the instrument have a very quick response so that an indication is given immediately the detector is in the vicinity of a leak. Further, in order that complex systems may be checked it is essential that a detector be small and portable.

It is the aim of the present invention to provide a portable, fast response instrument capable of detecting, locating, and measuring the rate of even very small vapour leaks in pipes and vessels in service.

To date, the only known method of detecting a small vapour leak in a pipe in service, is to pass a mirror over the suspected area, the presence of a leak being indicated by condensation on the mirror. This method has obvious disadvantages in that it depends on visual observation, and small leaks may not be noticed. As well, the rate of a leak cannot be determined quantitatively by this method.

According to the present invention, air from the vicinity of a suspected pipe or vessel is drawn past a moisture sensitive element in the form of a hygroscopic salt between two electrodes to which a potential is applied. The moisture content of the hygroscopic salt varies with the moisture content of the air drawn past it, so that the current between the electrodes is proportional to the moisture content of the sampled air. A vapour leak in the area from which the air is drawn therefore results in an increased current flow through the sensitive element, and the presence of such a leak is indicated by an ammeter placed in series with such element.

In this specification the term moisture is used to refer to all fluids which will be absorbed by a hygroscopic salt to cause ionization thereof.

To measure the rate of a vapour leak, use is made of an empirical relationship which states that the rate of the leak is proportional to the maximum rate of change of the square of the current passing between the electrodes of the moisture sensitive element. In practice, this current is passed through a resistor and the output of a thermocouple adjacent the resistor is amplified, differentiated and caused to actuate a suitable rate meter.

Before the rate meter reading can be converted to leak rate, account must be taken of the fact that, for a given leak rate, the maximum rate of change of the square of the sensing element current is dependent on the temperature of the air being drawn past the sensing element. A thermistor and suitable circuitry including a meter are therefore provided to measure the average air sample temperature. A calibration curve is then used to convert the temperature and rate indications to leak rate.

In its preferred embodiment, a leak detector according to the present invention comprises three units connected by flexible cable, these units being; a light weight hand-held probe unit through which air from the suspected area is sucked past a moisture sensitive element and a thermistor; a light weight portable indicator consisting of an ammeter conveniently carried in the hand or on a neck strap or combined with the probe unit; and a semiportable rate unit including an airflow meter, a rate meter, a temperature meter, associated circuitry and a suction pump.

It has been found that the present apparatus can measure water vapour leaks as small as 5 cc./day for air temperatures up to about 140° F. The sensitivity to leaks of this size would decrease for bulk air temperatures higher than 140° F. Such leak rates would not be observable by the condensation method previously mentioned.

Figure 2:
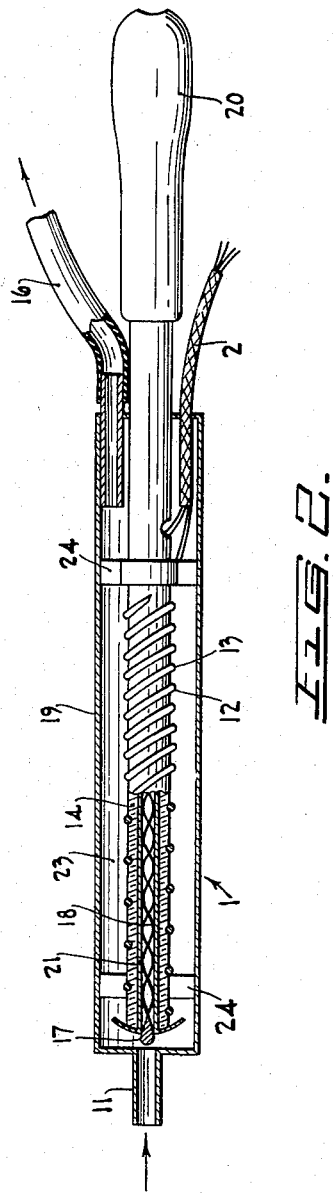
Figure 3:
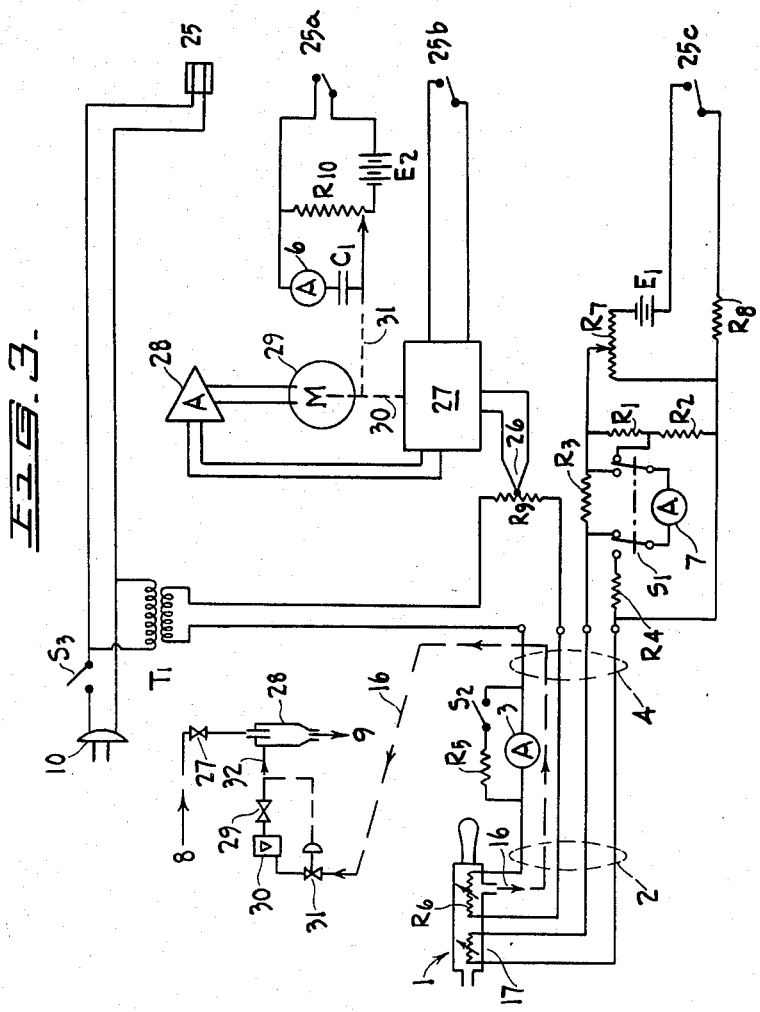
Figure 4:
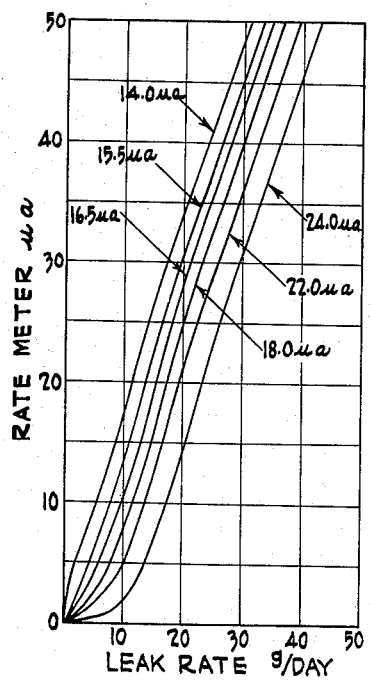

The preferred embodiment of the invention, as adapted to the detection of water vapour and heavy water vapour leaks, will be described with reference to the accompanying drawings in which, Figure 1 is a perspective view of the apparatus as used by an operator to check a pipe joint, Figure 2 is a longitudinal median section of the portable probe unit, Figure 3 is a schematic diagram of the electrical system, and Figure 4 illustrates the calibration curve for the apparatus.

The three units of the apparatus, the probe 1, the indicator 3 and the rate unit 5 are connected as shown in Figure 1 by suitable connectors 2 and 4 of four conductor cable combined with an air hose. The four conductors provide the necessary connections between a sensitive element and thermistor in the probe 1 and their associated circuits which will be described later. The air hose is connected to a suction pump in rate unit 5 so as to draw air through probe 1 at a rate indicated by flow meter 30. Compressed air inlet 8 and outlet 9 in rate unit 5 are provided for this pump, while the necessary power for the electrical circuits is obtained by a suitable connector 10.

It will be clear from Figure 1 that the apparatus is sufficiently flexible to allow the operator to test any part of a pipe such as that illustrated at numeral 22. The connector 4 may be of the order of fifty feet in length thereby allowing the operator to test large systems. To facilitate testing at remote points, connector 2 may be lengthened and probe 1 fitted with an extension handle.

In operation, the operator moves probe 1 over the area to be checked until the position of a leak is indicated by a deflection of indicator 3. Holding the probe 1 at the position of the leak, the maximum deflection of rate meter 6 is noted, together with the temperature reading from meter 7. By consulting a calibration curve such as that illustrated in Figure 4, these readings may then be converted to leak rate. The calibration curve is a plot of rate meter reading versus leak rate, for various temperature meter readings. In Figure 4, the meter readings are shown merely in microamps while the leak rate is given in grams/day.

From Figure 2, the probe 1 will be seen to consist of a hollow rod 21 bearing at one end a handle 20, and about which a cylindrical casing 19 is mounted by means of insulating discs 24 to form an annular chamber 23. The end of chamber 23 adjacent handle 20 is closed except for openings for air hose 16 and connector 2. The other end of housing 19 terminates in a nozzle 11 which is of much smaller cross-section than housing 19 so that small leaks may be accurately located. A lithium chloride impregnated glass tape 14 is wound about rod 21 and electrodes, in the form of two silver wires 12 and 13 helically wound about glass tape 14 are connected to a 25 v. A.C. source by means of connector 2. The lithium chloride, being hygroscopic, absorbs water vapour from the air sucked in through nozzle 11 and forms an electrolyte between wires 12 and 13. An increase in moisture content of the air ionizes more of the lithium chloride and causes an increase in the current flowing between wires 12 and 13. Due to the heating effect of the current in wires 12 and 13 and to the relationship between this current and the concentration of the lithium chloride, the concentration of the salt (and its temperature) tends to reach an equilibrium value for any given air moisture content and bulk air temperature. As the salt absorbs more moisture the current increases, thus driving water off at a greater rate. Eventually equilibrium is reached at a temperature such that the rate of water evaporation equals the rate of water absorption. At equilibrium a constant current flows between the electrodes, but, as will become apparent, the present invention makes use of the changing current flow which precedes equilibrium.

Immediately adjacent the inner end of nozzle 11 a thermistor 17 is mounted so as to be directly in the path of the incoming air. Leads 18 extend from thermistor 17 down the center of rod 21 and out connector 2 to a temperature indicating circuit in rate unit 5. Thermistor 17, being in the path of the incoming air and situated between the nozzle 11 and the wires 12 and 13, is not affected by the heating effect of the current in wires 12 and 13. The temperature of thermistor 17 then, is dependent only on the average temperature of the air entering nozzle 11, this temperature being referred to as bulk air temperature.

Referring to Figure 3, compressed air applied at inlet 8 passes through cock 27 to Venturi pump 28 and is exhausted at outlet 9. The suction line 32 of the Venturi pump 28 passes through cock 29 and flow meter 30 and is connected to probe 1 by hose 16. Flow stabilizer 31 is connected across flow meter 30 and cock 29 to ensure a constant flow rate of approximately 15 cubic feet per hour. It is to be understood that this apparatus for providing a constant flow of air through probe 1 is of conventional form and indeed may take any other suitable form without departing from the present invention.

On closing main switch S3 situated on rate unit 5, the 110 v. A.C. current of line 10 is converted at transformer T1 to 25 v. A.C. which is applied to a series circuit including ammeter 3, resistor R9 and the moisture sensitive element in probe 1, here represented as a variable resistance R6. Ammeter 3, normally a 0–100 ma. meter, is bypassed by resistor R5 and switch S2 which provide a 0–500 ma. calibration of meter 3 for use when the power to the sensitive element is turned on after a lengthy interval. The current at such a time may be large due to the excess water absorbed by the lithium chloride during the interval when no current was applied to wires 12 and 13. It is obvious that an increase in the water content of the lithium chloride between wires 12 and 13 effectively decreases R6 and results in an increase in the reading of indicator 3.

A thermocouple junction 26 is placed in close proximity to resistor R9 so that its temperature is proportional to the rate of change of the current through R9. In practice, the resistor R9 consists of a resistance wire helically wound about the junction 26. The thermocouple E.M.F. is supplied to a self balancing amplifier of the well known Brown type and the mechanical balancing mechanism of this amplifier is caused to control a linear potentiometer in a differentiating circuit including an ammeter which acts as the rate meter 6 previously mentioned. More specifically, junction 26 is connected to a bridge network 27, the "cold" junction of the thermocouple being at bridge 27 and operating at ambient temperature. The unbalance signal of bridge 27 is amplified in amplifier 28 and moves balancing motor 29 in such a manner as to balance bridge 27. The balancing motor 29 is connected to a variable resistance in bridge 27 by means of a shaft 30.

By a suitable mechanical connection to shaft 30, a second shaft 31 controls the setting of linear potentiometer R10 which is supplied by a 22.5 volt battery E2 through a relay contact 25a. Contact 25a together with contacts 25b and 25c which control the other battery circuits, are pulled in by relay 25 on closing main switch 3. The output of potentiometer R10 is supplied to the series combination of condenser C1 and a null reading ammeter 6. Due to the differentiating effect on the condenser charging or discharging current, the current indicated by ammeter 6 decays from an initial maximum value when any change is made in the setting of potentiometer R10. It will be obvious that the maximum reading of ammeter 6 will be proportional to the maximum rate of change of the temperature of junction 26 and will therefore be proportional to the maximum rate of change of the square of the current flowing in the sensitive element of probe 1. Since the air passing through the probe 1 moves at a constant rate, the maximum reading of ammeter 6 is proportional to the rate of the vapour leak being measured.

Thermistor 17 forms one arm of a bridge circuit including resistors R1, R2 and R3. The D.C. supply for this bridge, battery E1, supplies a potentiometer R7 through relay contact 25c and current limiting resistor R8, the output of potentiometer R7 being applied between the junction of resistors R1 and R3 and the junction of resistor R2 and thermistor 17.

A double-pole double-throw switch S1, in its position shown in Figure 3, connects an ammeter 7 as the indicating element for the bridge network. In its second position, switch S1 connects ammeter 7 in series with a large resistance R4 across resistances R1 and R2. In this latter connection, ammeter 7 effectively becomes a voltmeter and indicates the voltage output of potentiometer R7. This provision is made in order that the potential applied to the bridge may be checked and maintained constant by adjustment of potentiometer R7.

In setting up a proper calibration curve for the apparatus, it has been found convenient to hold the probe over breakers of water of known evaporation rates and to observe the maximum deflection on the rate meter 6 for constant bulk air temperatures and for a constant air flow through the probe. Curves such as those shown in Figure 4 are then plotted and used to convert subsequent temperature and rate indications into leak rate.

The lithium chloride element described above is useful in detecting heavy water vapour as well as water vapour. For the detection of other vapours other salts may be substituted for the lithium chloride.

It is to be understood that the physical arrangement of the apparatus may differ considerably from the preferred embodiment disclosed, without departing from the scope of the invention which is defined in the appended claims.

What we claim is:

1. A leak rate measuring system comprising an element whose electrical properties depend on the moisture content of air about the element, means for conducting air from a predetermined vicinity past said element at a predetermined rate, a source of electrical potential, means connecting said element and said source of potential in an electrical circuit the current in which is dependent upon the electrical properties of said element, and means sensitive to the current in said circuit to generate a signal proportional to the maximum rate of change of the square of the current.

2. A leak rate measuring system as claimed in claim 1 wherein said element comprises a hydroscopic salt between electrodes.

3. A leak rate measuring system as claimed in claim 1 wherein said means sensitive to the current in said circuit includes a resistor in said circuit, a thermocouple junction in heat exchange relationship with said resistor, and means for differentiating the output of said thermocouple.

4. A leak rate measuring system comprising an element whose electrical properties depend on the moisture content of air about the element, means for conducting air from a predetermined vicinity past said element at a predetermined rate, a source of electrical potential, a resistor, means connecting said element, resistor and source of potential in an electrical circuit the current in which is dependent upon the moisture content of the air surrounding said element, a thermocouple junction in heat exchange relationship with said resistor, a self-balancing bridge including a motor driven balancing shaft, means applying the E.M.F. of said thermocouple to said self balancing bridge, a source of D.C. potential, a potentiometer connected across said source of D.C. potential, a differentiating network including an ammeter, means connecting said network across the output of said potentiometer, mechanical means connecting said potentiometer to said motor driven balancing shaft whereby said potentiometer setting is determined by the rotational position of said balancing shaft and the maximum leading of said ammeter is proportional to the maximum rate of change of the square of the current in said electrical circuit.

5. A leak rate measuring system as claimed in claim 4 including a light weight portable probe enclosing said moisture sensitive element, a flexible tube for drawing air through said probe, and flexible cable for connecting said moisture sensitive element into its electrical circuit.

6. A leak rate measuring system comprising an element whose electrical properties depend on the moisture content of air about the element, means for conducting air from a predetermined vicinity past said element at a predetermined rate, a source of electrical potential, a resistor, means connecting said element, resistor and source of potential in an electrical circuit the current in which is dependent upon the moisture content of the air surrounding said element, a thermocouple junction in heat exchange relationship with said resistor, means sensitive to the output of said thermocouple and effective to generate a signal proportional to the maximum rate of change of the square of the current in said circuit, and indicator means sensitive to said signal.

7. A leak rate measuring system as claimed in claim 6 including; a differentiating circuit including a source of potential, an indicator and a potentiometer; and a self-balancing bridge to which is fed the output of said thermocouple, said potentiometer being controlled from a mechanical drive of said self-balancing bridge.

8. A leak rate measuring system comprising a light weight portable probe, a moisture sensitive element whose electrical properties depend on the moisture content of air surrounding it, means for drawing air from a predetermined vicinity through said probe, said moisture sensitive element being mounted in said probe in the path of flow of said air, a source of electrical potential, means for connecting said source of potential to said element, means sensitive to the current flowing through said element and effective to indicate the maximum rate of change of the square of said current.

9. A leak rate measuring system as claimed in claim 8 including a temperature sensitive element mounted in said probe in front of said moisture sensitive element relative to said air flow, and means connected to said temperature sensitive element to indicate the temperature of said air.

10. A leak rate measuring system as claimed in claim 8 including a resistance, means connecting said resistance in a series circuit with said element and said source of potential, a thermocouple junction in heat exchange relationship with said resistance and means sensitive to the output of said thermocouple and effective to indicate the maximum rate of change of the square of said current in said circuit.

11. A leak rate measuring system as claimed in claim 10 wherein said last-mentioned means comprises; a self-balancing bridge to which the output of said thermocouple is applied, a balancing element in said bridge being controlled by a motor driven shaft; a reactive element in series with a source of variable potential and an indicator; and means for adjusting said last-mentioned source in accordance with motion of said motor driven shaft.

12. A leak rate measuring system as claimed in claim 10 wherein said last-mentioned means comprises; a self-balancing bridge including a motor driven balancing shaft, means for applying the E.M.F. of said thermocouple to said bridge, a source of D.C. potential, a potentiometer connected across said source of D.C. potential, a differentiating network including an ammeter, means connecting said network across the output of said potentiometer, mechanical means connecting said potentiometer to said motor driven balancing shaft whereby said potentiometer setting is determined by the rotational position of said balancing shaft.

References Cited in the file of this patent
UNITED STATES PATENTS

| | | |
|---|---|---|
| 1,381,450 | Butterfield | June 14, 1921 |
| 2,412,192 | Agnew | Dec. 10, 1946 |
| 2,642,737 | Kinsella | June 23, 1953 |
| 2,691,134 | Ford | Oct. 5, 1954 |
| 2,696,119 | Jones | Dec. 7, 1954 |
| 2,706,398 | Davidson | Apr. 19, 1955 |
| 2,707,880 | Wannamaker | May 10, 1955 |